(12) United States Patent
Liu et al.

(10) Patent No.: US 7,642,750 B2
(45) Date of Patent: Jan. 5, 2010

(54) BATTERY CHARGE/DISCHARGE CONTROL CIRCUIT

(75) Inventors: Shiqiang Liu, Chengdu (CN); Sean Xiao, Shanghai (CN); Guoxing Li, Sunnyvale, CA (US); Liusheng Liu, San Jose, CA (US)

(73) Assignee: O2Micro International Limited, Grand Cayman (KY)

( * ) Notice: Subject to any disclaimer, the term of this patent is extended or adjusted under 35 U.S.C. 154(b) by 220 days.

(21) Appl. No.: 11/508,865

(22) Filed: Aug. 22, 2006

(65) Prior Publication Data

US 2007/0075684 A1    Apr. 5, 2007

Related U.S. Application Data

(60) Provisional application No. 60/723,904, filed on Oct. 4, 2005.

(51) Int. Cl.
*H02J 7/00* (2006.01)
*H02J 7/04* (2006.01)

(52) U.S. Cl. .............. 320/127; 320/128; 320/134; 320/135; 320/132; 320/136

(58) Field of Classification Search ............. 320/128, 320/127, 134, 135, 136, 132, 162, 160
See application file for complete search history.

(56) References Cited

U.S. PATENT DOCUMENTS 4,812,672 A    3/1989    Cowan et al.

| 5,536,977 A | 7/1996 | Williams |
| 6,198,252 B1 * | 3/2001 | Mukainakano ............. 320/128 |
| 6,504,345 B2 * | 1/2003 | Sakurai et al. ............. 320/162 |
| 2004/0178766 A1 * | 9/2004 | Bucur et al. ............. 320/112 |
| 2005/0156566 A1 * | 7/2005 | Thorsoe et al. ............. 320/116 |

FOREIGN PATENT DOCUMENTS

JP    2005-080491    3/2005

OTHER PUBLICATIONS

Japanese Notice of Reasons for Rejection dated Mar. 25, 2008 issued in related Japanese Patent Application 2006-272138 (English language translation—2 pages).

* cited by examiner

*Primary Examiner*—Edward Tso
*Assistant Examiner*—Alexis Boateng

(57) ABSTRACT

A circuit is used for controlling charging and discharging a battery. The circuit comprises a first MOSFET for controlling discharging the battery, and a second MOSFET coupled in series to the battery and the first MOSFET for controlling charging the battery. The first and second MOSFETs have body diodes respectively, and the first body diode of the first MOSFET and the second body diode of the second MOSFET are coupled in opposite directions. A load is coupled to the battery and a common node between the first and second MOSFETs such that power in the battery is delivered to said load when the first MOSFET is turned on. The circuit further comprises a power source coupled to the second switch in series and power is delivered from the power source to the battery when the first and second MOSFETs are turned on.

20 Claims, 5 Drawing Sheets

BATTERY CHARGE/DISCHARGE CONTROL CIRCUIT

CROSS REFERENCE TO PROVISIONAL APPLICATION

This application claims priority to the co-pending provisional patent application, Ser. No. 60/723,904, entitled "A Battery Charge/Discharge Control Circuit," with filing date Oct. 4, 2005, and assigned to the assignee of the present invention, which is herein incorporated by reference in its entirety.

TECHINCAL FIELD

The invention relates to a battery charging and discharging circuit, and more particularly, to a battery charging and discharging circuit with low cost and high efficiency.

BACKGROUND ART

In battery protecting applications, typically, two Metal Oxide Semiconductor Field Effect Transistors (MOSFETS) are used to control charging and discharging loops. One MOSFET is employed to turn on and turn off the discharging loop and the other MOSFET is employed to turn on and turn off the charging loop. It should be noted that the MOSFETs have inherent body diodes as shown in Prior Art FIGS. 1 and 2.

Referring to PRIOR ART FIG. 1, a series connection topology 100 for charging and discharging a battery 110 in the prior art is illustrated. The series connection topology 100 has two MOSFETs 104 and 102 which are coupled in series. The MOSFET 104 has a body diode 114, and is used to enable or disenable the charging loop. The MOSFET 102 has a body diode 112, and is used to enable or disenable the discharging loop. A load or a power source 130 is coupled to nodes 140 and 142.

The MOSFET 102 and the MOSFET 104 have to meet certain standards, such as high current capacity and low on-state resistance (Ron), since they carry the same current. In order for the MOSFETs 102 and 104 to meet these standards, the cost of the series connection topology 100 is prohibitively high.

In addition, while the MOSFET 104 is turned on to enable the charging loop, the MOSFET 102 will also be turned on to reduce the voltage loss. Similarly, for the discharging loop, both the MOSFETs 102 and 104 are turned on. As such, the MOSFETs 102 and 104 are always turned on, so the insert impedance is ($Ron_2+Ron_3$), where the $Ron_2$ is the on-state resistance of the MOSFET 102, and the $Ron_3$ is the on-state resistance of the MOSFET 104. Therefore, the impedance is comparatively high, which means more power loss.

Referring to PRIOR ART FIG. 2, another connection topology 200 in the prior art, namely a parallel connection, is illustrated. In a high power application, this type of topology is preferable.

The parallel connection topology 200 has a MOSFET 204 and a MOSFET 202 which are coupled in parallel. The MOSFET 204 has a body diode 214, and is used to enable or disenable the charging loop. The MOSFET 202 has a body diode 212, and is used to enable or disenable the discharging loop. The charging loop is independent of the discharging loop.

For the discharging loop, a load 222 is coupled to nodes 240 and 242. The discharging current flows through the load 222 and the MOSFET 202. The insert impedance is only the on-state resistance of the MOSFET 202 ($Ron_2$). Accordingly, the discharging loop has a low power loss. Similarly, for the charging loop, an external power source 220 is coupled to nodes 240 and 244, and the charging current flows through the MOSFET 204. The insert impedance is only the on-state resistance of the MOSFET 204 ($Ron_3$). It should be noted that the charging and discharging currents flow through the MOSFET 204 and the MOSFET 202, respectively. Therefore, the MOSFETs 204 and 202 are able to use different types of MOSFETs. For example, since, the power is provided by the external power source 220 and is not significant during charging, the MOSFET 204 in the topology 200 is able to have a high on-state resistance to save cost.

However, the power source 220 may be in failure. For example, in the topology 200 shown in FIG. 2, the nodes 240 and 244 serving as output ports may be shorted, shown as a circuit 201 in PRIOR ART FIG. 3a, or the nodes 240 and 244 are plugged in reverse, shown as a circuit 203 in PRIOR ART FIG. 3b. In either case, the battery 210 will be discharged through the body diode 214 in the MOSFET 204, even if the MOSFET 204 is turned off. That is, the charging loop cannot be cut off completely in both of these cases illustrated in PRIOR ART FIGS. 3a and 3b. Moreover, because the discharging loop and the charging loop are independent from each other in FIG. 2, the charging and discharging current cannot be sensed by one feedback signal, which increases the cost.

SUMMARY OF THE INVENTION

It is an object of the present invention to provide a circuit or method for controlling the charging and discharging of a battery with low cost, high efficiency and protection function.

In order to achieve the above object, the present invention provides a circuit for controlling charging and discharging a battery with a series-parallel connection topology. The circuit comprises a first MOSFET for controlling discharging the battery, and a second MOSFET coupled in series to the battery and the first MOSFET for controlling charging the battery. The first and second MOSFETs have body diodes respectively, and the first body diode of the first MOSFET and the second body diode of the second MOSFET are in opposite directions. A load is coupled to the battery and a common node between the first and second MOSFETs such that power in the battery is delivered to the load when the first MOSFET is turned on. The circuit further comprises a power source coupled to the second switch in series and power is delivered from the power source to the battery when the first and second MOSFETs are turned on.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

PRIOR ART

PRIOR ART

PRIOR ART

PRIOR ART

DESCRIPTION OF EMBODIMENTS OF THE PRESENT INVENTION

Reference will now be made in detail to the embodiments of the present invention, a battery charge/discharge control circuit. While the invention will be described in conjunction with the embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Figure 4:
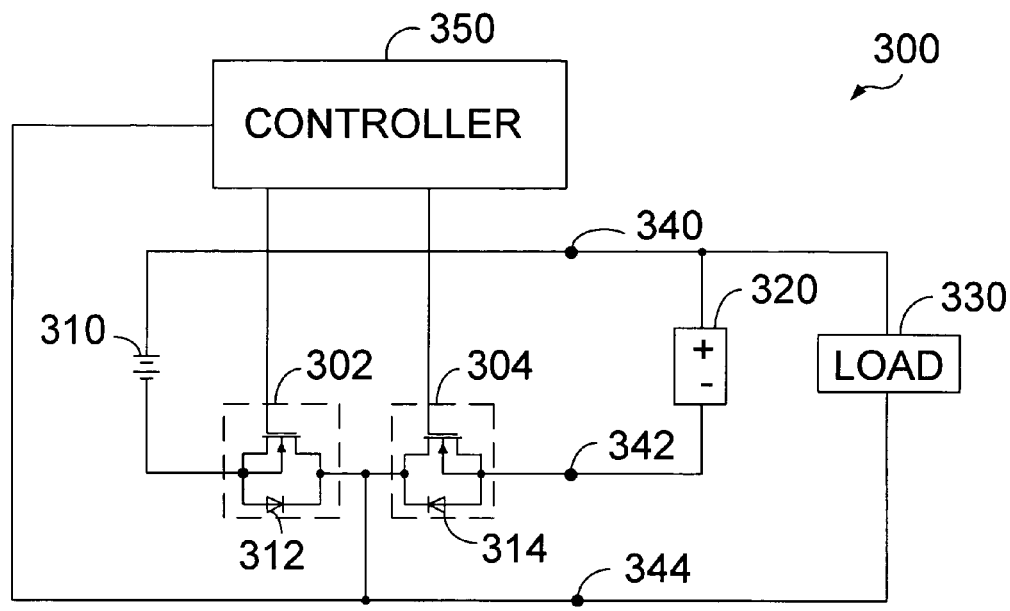
FIG. 4 is a diagram showing a charging and discharging circuit, in accordance with one embodiment of the present invention.

Referring to FIG. 4, the circuit 300 for charging and discharging a battery 310 with series-parallel connection topology according to one embodiment of the present invention is illustrated. The circuit 300 comprises a battery and two switches, such as MOSFETs 302 and 304 coupled in series. The two MOSFETs are coupled with each other in a common drain connection and are N type MOSFETs, in one embodiment.

Figure 5A:
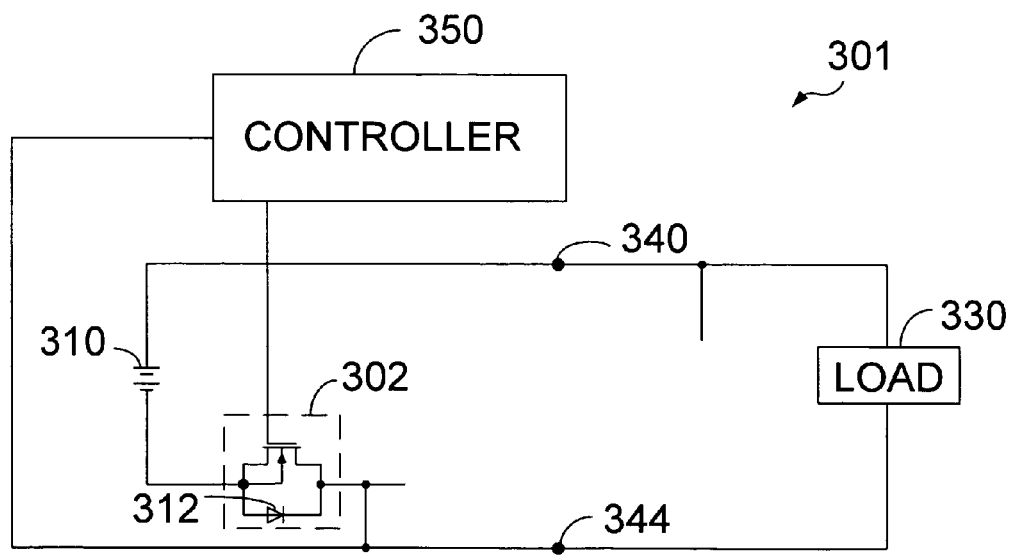
FIG. 5a is a diagram showing a discharging loop of the charging and discharging circuit shown in FIG. 4, in accordance with one embodiment of the present invention.
Figure 5B:
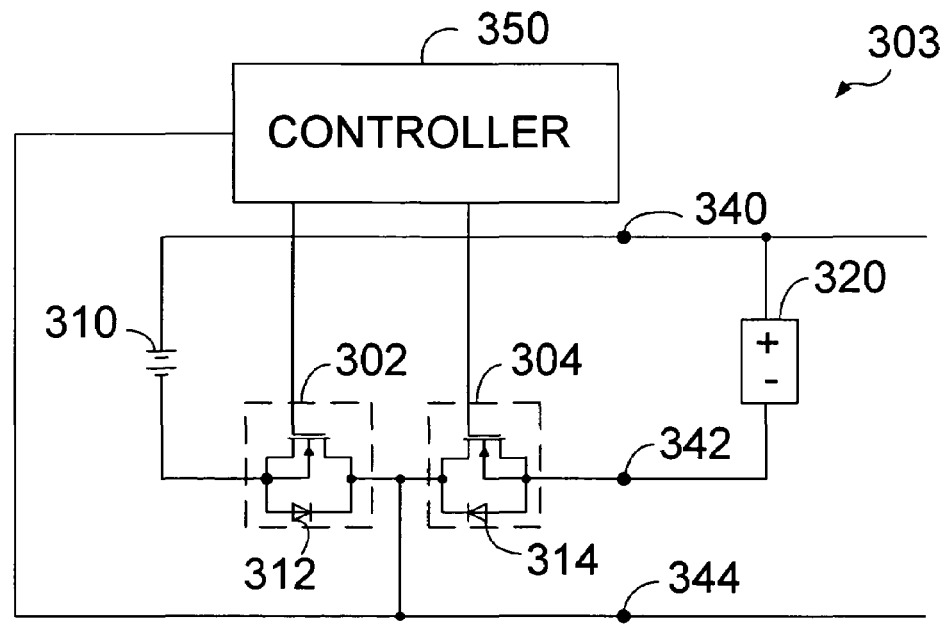
FIG. 5b is a diagram showing a charging loop of the charging and discharging circuit shown in FIG. 4, in accordance with one embodiment of the present invention.

As shown in FIGS. 4 and 5b, during charging, a charging loop 303 is enabled, as shown in FIG. 5b, and the battery 310 of the circuit 300 is coupled to a power source 320. As shown in FIGS. 4 and 5a, during discharging, a discharging loop 301 is enabled, as shown in FIG. 5a, and the battery 310 is coupled to a load 330. The charging and discharging loops will be described in detail hereinafter.

It will be apparent to those skilled in the art that a MOSFET usually has an inherent parasitic diode, i.e., a body diode, which is formed between the drain and the source of the MOSFET. As to an N-MOSFET, the cathode of the body diode is located at the drain of the MOSFET, and the anode is located at the source in one embodiment. As to a P-MOSFET, the locations of the polarities are reversed in another embodiment. As shown in FIG. 4, the MOSFET 304 has a body diode 314 and the MOSFET 302 has a body diode 312.

Returning to FIGS. 4 and 5b, the N-MOSFET 304 is used to enable or disenable the charging loop 303. If the voltage on the gate of the MOSFET 304 is a threshold voltage higher than the voltage on the source of the MOSFET 304, the MOSFET 304 is turned on and the charging loop 303 is enabled. If not, the charging loop 303 is disenabled.

Similarly, the MOSFET 302 of FIGS. 4 and 5a, is used to enable or disenable the discharging loop 301. If the voltage on the gate of the MOSFET 302 is a threshold voltage higher than the voltage on the source of the MOSFET 302, the MOSFET 302 is turned on and the discharging loop 301 is enabled. If not, the discharging loop 301 is disenabled.

As shown in FIG. 4, the circuit 300 further comprises a controller 350 coupled to the gates of the MOSFETs 302 and 304 for turning on or off the MOSFETs 302 and 304. Specifically, the controller 350 is capable of enabling or disenabling the respective charging and the discharging loops by adjusting the voltage on the gates of MOSFETs 302 and 304.

In accordance with another embodiment, a signal from the common node of the MOSFETs 302 and 304 is transmitted into the controller. The signal is a current sensing signal for monitoring the charging or discharging of the circuit 300 for over-current protection.

Figure 1:
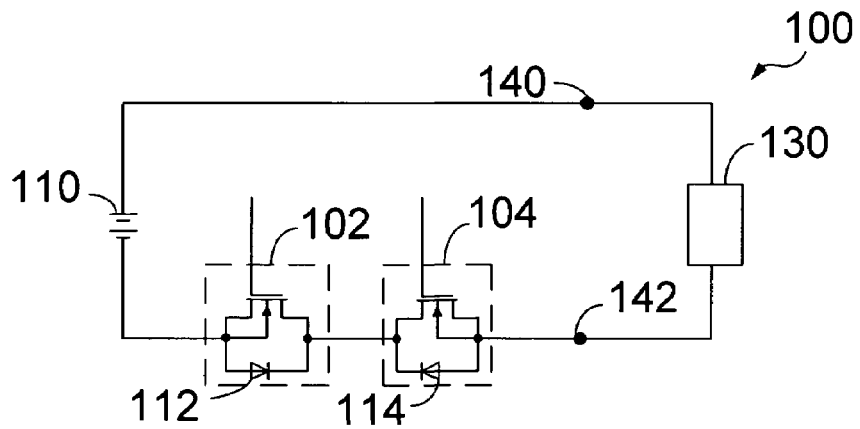
FIG. 1 is a diagram showing a series connection topology circuit for charging and discharging a battery in the prior art.
Figure 2:
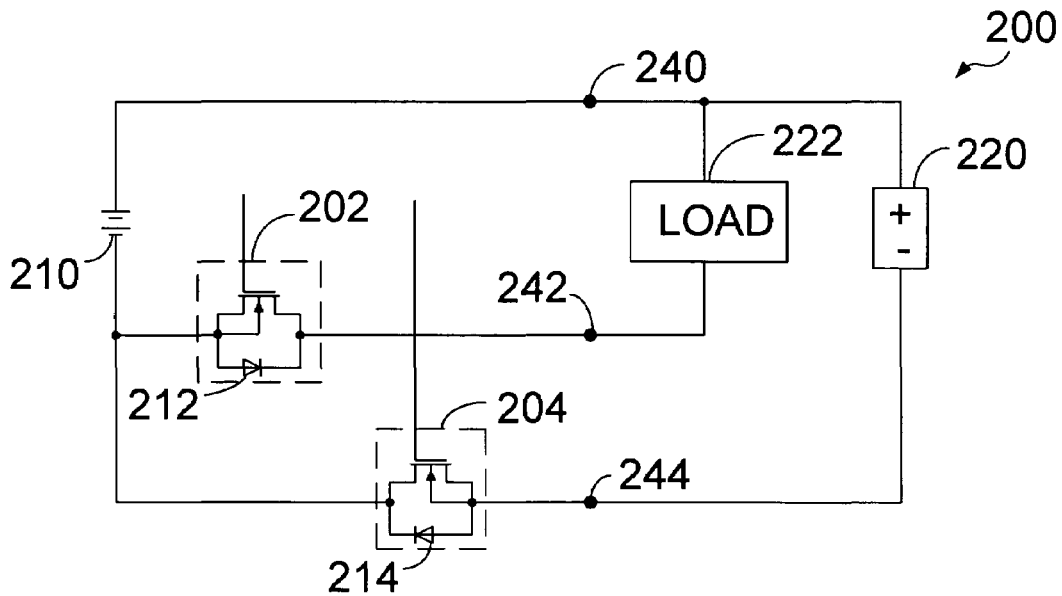
FIG. 2 is a diagram showing a parallel connection topology circuit for charging and discharging a battery in the prior art.

Referring now back to FIG. 5a, the discharging loop 301 of the circuit 300 is illustrated. As shown, a load 330 is coupled to nodes 340 and 344 of the circuit 300. The MOSFET 304 is not shown as part of the discharging loop 301. The MOSFET 302 is turned on such that the discharging current flows from the drain to the source of the MOSFET 302. It will be apparent to those skilled in the art that the discharging current flows through only the MOSFET 302 in the discharging loop. As such, the insert impedance is only the on-state resistance ($Ron_2$) of the MOSFET 302. Compared with the series connection in PRIOR ART FIG. 1, the circuit 300 has a low discharging loss. Therefore, low heat and high efficiency can be achieved in the present embodiment.

Referring now back to FIG. 5b, the charging loop 303 of the circuit 300 is illustrated. As shown in FIG. 5b, a power source 320 is coupled to nodes 340 and 342. In the charging loop 303, the MOSFET 304 is turned on such that the charging current flows from the drain to the source of the MOSFET 304.

Moreover, in the charging loop 303 the charging current also flows through the MOSFET 302. In order to minimize the voltage loss, the MOSFET 302 is also turned on. If the MOSFET 302 is off in the charging loop 303, the current flows through the body diode 312 and the forward voltage drop is equal to the forward voltage drop of a diode, about 0.7 volts typically. On the other hand, if the MOSFET 302 is turned on, the voltage drop is reduced to less than a hundred millivolts.

According to one embodiment of the present invention, the charging loop 303 and the discharging loop 301 are independently enabled from each other.

In another embodiment of the present invention, both the charging loop 303 and the discharging loop 301 can be enabled at the same time to improve efficiency. In other words, the power source 320 and the load 330 are coupled to the nodes 340 and 342 and the nodes 340 and 344 at the same time, as shown in the circuit configuration of FIG. 4.

The circuit 300 of FIG. 4 is able to address failures of premature discharge of the battery that are associated with the power source 320, especially during charging of the battery 310. For example, a failure occurs in the charging loop 303 when there is a short between nodes 340 and 342. Another failure occurs when the nodes 340 and 342 are plugged in reverse. In both of these situations, the MOSFETs 302 and 304 are turned off by the controller 350, in accordance with one embodiment of the present invention. As such, the battery 310 cannot be discharged through the body diode 312 in the MOSFET 302, since the body diode 312 and the discharging current are in opposite directions. Thus, the charging loop 303 is cut off completely and premature discharge of the battery 310 can be prevented.

In accordance with one embodiment of the present invention, the MOSFET 302 is used as a charge/discharge current sensor in the circuit 300 of FIG. 4. Specifically, MOSFETs 302 and 304 are able to carry predetermined currents that are configured by the controller 350. When the output current of the power source 320 is so great that the current flowing through the MOSFET 302 is greater than the predetermined current, or the load 330 is so great that the current flowing through the MOSFET 302 is greater than the predetermined current, the MOSFETs 302 and 304 may be damaged. As such, a charge/discharge current sensor (not shown) is provided for over-current protection. In one embodiment, the charge/discharge current sensor is provided in the controller 350. When the controller 350 determines that the current sensed by the charge/discharge current sensor is greater than the predetermined current, the controller 350 will turn down the MOSFETs 302 and 304 to protect the circuit 300.

Specifically, the MOSFET 302 is turned on both in the discharging loop 301 and in the charging loop 303, so the on-state resistance of the MOSFET 302 exists both in the discharging loop 301 and in the charging loop 303. The controller 350 senses the current through the MOSFET 302 in the charging and discharging loops for monitoring the current in the circuit 300 and controlling the MOSFETs 302 and 304. In the charging loop 303, the current flows through the MOSFET 302. The charging current is calculated in Equation (1) as follows:

$$I = V_{DS}/\text{Ron} \tag{1}$$

In equation 1, $V_{DS}$ is a voltage drop between the drain and the source of the MOSFET 302. Also, Ron is the on-state resistance of the MOSFET 302. In the present embodiment, the controller 350 senses $V_D$ as a voltage signal and obtains the current through the charging loop.

Similarly, in the discharging loop 301, the current also flows through the MOSFET 302, and the value of the discharge current is calculated using Equation (1).

Thus, the MOSFET 302 can be used as the current sense resistor in the discharging loop 301 or the charging loop 303. A current sensing signal will be obtained at the node 344 in one embodiment of the present invention. In view of this, the cost for a current sense resistor is reduced, in accordance with one embodiment of the present invention.

In most cases, the discharging current is larger than the charging current. Even if the charging current flows through the MOSFETs 302 and 304 during charging and the power loss is comparatively significant, the charging performance is not critical. The power source 320 provides all the power, including the charging power for the battery 310 and the lost power. Thus, according to one embodiment of the present invention, it is possible that the MOSFET 304 can be a cheaper, medium current MOSFET, and the MOSFET 302 can be an expensive high current, low on-state resistance MOSFET. Therefore, the cost for the charging and discharging circuit can be reduced, compared with the series solution in conventional circuits, as exhibited in PRIOR ART FIG. 1, in which the two MOSFETs carry the same current and must be the same high standard power MOSFETs.

Figure 3A:
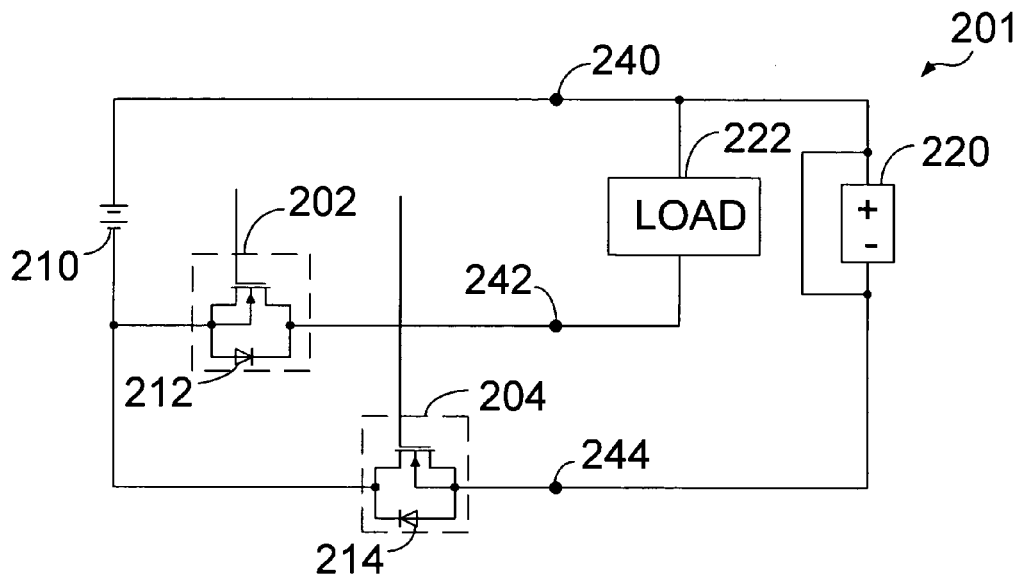
FIG. 3a is a diagram showing one failure situation of the topology shown in PRIOR ART FIG. 2.
Figure 3B:
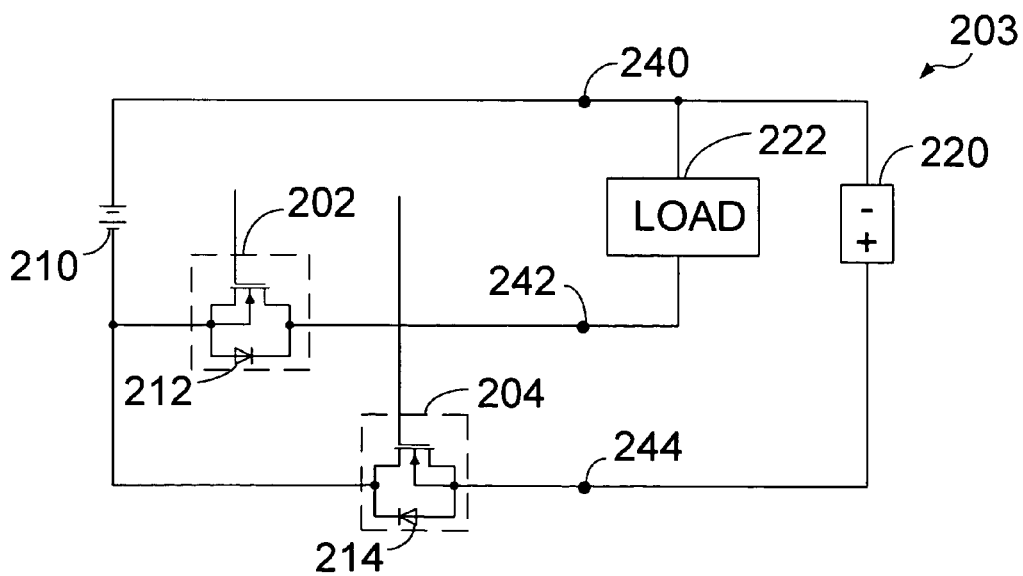
FIG. 3b is a diagram showing another failure situation of the topology shown in PRIOR ART FIG. 2.
Figure 6:
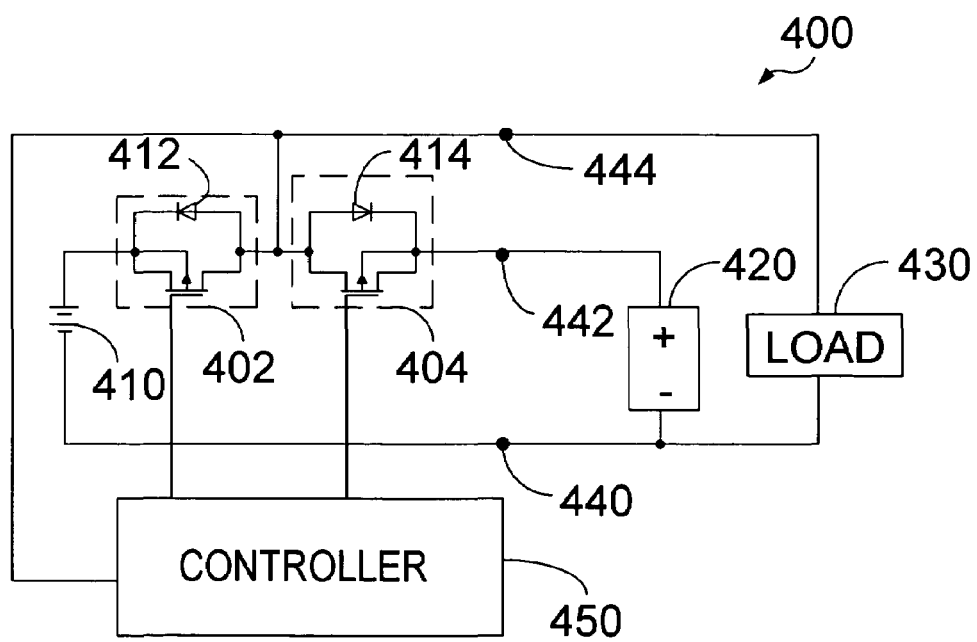
FIG. 6 is a diagram showing a charging and discharging circuit, in accordance with one embodiment of the present invention.

The circuit 400 in FIG. 6 is another embodiment according to embodiments of the present invention. The circuit 400 is similar to the circuit 300 shown in FIG. 4. As such, similar elements in FIGS. 4 and 6 are designated using similar reference numbers. For clarity, similar elements in the circuits 400 and 300 have been previously described in association with FIG. 3 and will not be described in great detail herein.

As shown in FIG. 6, the circuit 400 has two P-MOSFETs 402 and 404. It should be noted that as to P-MOSFETs, the connections of body diodes are different from N-MOSFETs. The cathode of the body diode is located at the source of the MOSFET, and the anode is located at the drain, as shown as the body diodes 412 and 414 of the MOSFETs 402 and 404.

The circuit 400 for charging and discharging a battery 410 as shown in FIG. 6 comprises two switches, such as P-MOSFETs 402 and 404 coupled in series. The P-MOSFET 404 is used to enable or disenable the charging loop of the battery 410. During charging, the battery 410 of the circuit 400 is coupled to a power source 420 through nodes 440 and 442, and through the P-MOSFETS 404 and 402 in the charging loop.

Further, the P-MOSFET 402 is used to enable or disenable the discharging loop of the battery 410. During discharging, the battery 410 is coupled to a load 430 through nodes 440 and 444 and P-MOSFET 402 in the discharging loop. In addition, in one embodiment of the present invention, both charging and discharging can be enabled at the same time to improve the efficiency.

During charging, the power source 420 may be in failure. For example, nodes 440 and 442 of the circuit 400 may be shorted, or the nodes 440 and 442 are plugged in reverse. In both cases, the MOSFET 402 is turned off by the controller 450 in the present embodiment. As such, the battery 410 cannot be discharged through the body diode 412 in the MOSFET 402, since the body diode 412 and the discharging current are in opposite directions. Thus, the charging loop is cut off completely and the premature discharge can be prevented.

The circuit 400 further comprises a controller 450 coupled to the gates of the MOSFETs 402 and 404 for turning on or off the MOSFETs 402 and 404 so as to enable or disenable charging and discharging the battery 410. A signal from the common node of the MOSFETs 402 and 404 is transmitted into the controller. In accordance with one embodiment of the present invention, the signal is a current sensing signal for monitoring the charging or discharging of the circuit 400.

Figure 7:
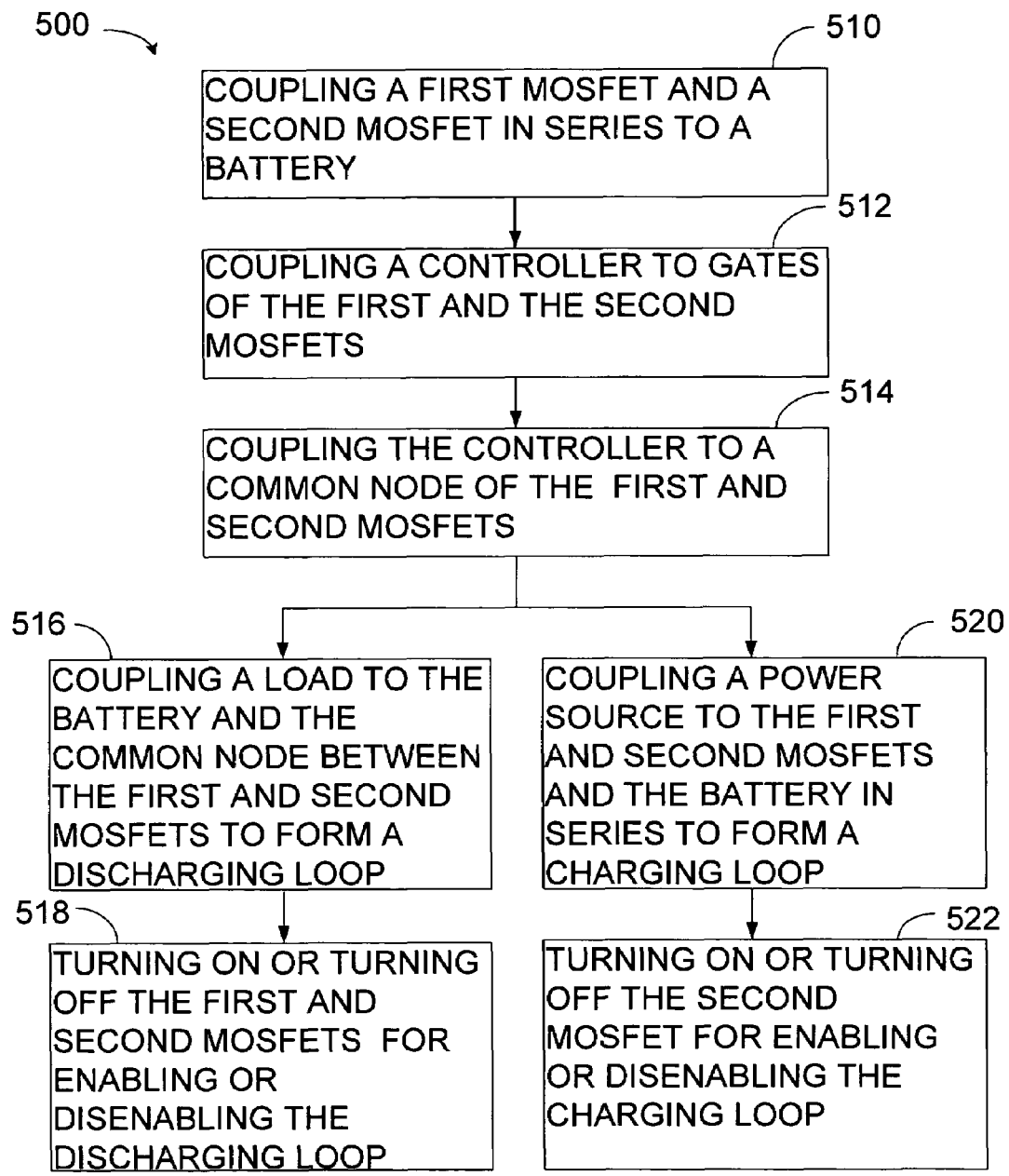
FIG. 7 is the diagram showing a method for controlling charging and discharging a battery according to one embodiment of the present invention.

Referring to FIG. 7, a method 500 for controlling charging and discharging a battery according to one embodiment of the present invention is illustrated. As shown in FIG. 7, at 510, a first MOSFET and a second MOSFET are coupled to the battery in series. The first and second MOSFETs are coupled to each other in a common drain connection. The first MOSFET is used to control a discharging loop. The second MOSFET is used to control a charging loop.

At 512, a controller is coupled to gates of the first and second MOSFETs for controlling voltage on the gates of first and second MOSFETs to implement discharging and charging. According to one embodiment of the present invention, for example, the first and second MOSFETs are N type MOSFETs. If the voltage on the gate of the second MOSFET is a threshold voltage higher than the voltage at the source of the second MOSFET, the second MOSFET is turned on and a charging loop is enabled. If not, the charging loop is disenabled. Similarly, the first MOSFET is used to enable or disenable the discharging loop through controlling the voltage on the gate of the first MOSFET by the controller.

At 514, the controller is coupled to the battery and the common node between the first and second MOSFETs to sense a current signal to protect the battery from over-current. The controller obtains the voltage drop signal between the drain and the source of the first MOSFET, and calculates the current flowing through the first MOSFET by means of the voltage drop signal and an on-state resistance of the first MOSFET. When the calculated value of current is greater than a predetermined current configured by the controller in advance, the controller will turn off the first and second MOSFETs to prevent the first and second MOSFETs from being damaged.

At 516, a load is coupled to the battery and a common node between the first and second MOSFETs to form the discharging loop for delivering power from the battery to the load. It should be noted that the discharging current flows through only the first MOSFET in the discharging loop. As such, the insert impedance is only the on-state resistance of the first MOSFET. Compared with the series connection in the prior art, the method according to one embodiment of the present invention has a low discharging loss.

At 518, the first MOSFET is turned on by the controller to enable the discharging loop. The power in the battery will be delivered to the load. Alternatively, the first MOSFET is turned off by the controller to disenable the discharging loop.

At 520, a power source is coupled to the first and second MOSFETs and the battery in series to form the charging loop for delivering power from the power source to the battery.

At 522, the second MOSFET is turned on by the controller to enable the charging loop. The power is delivered from the power source to the battery. In order to minimize the voltage loss, the first MOSFET is also turned on. Because if the first MOSFET is off in the charging loop, the current flows through an inherent body diode of the first MOSFET and the forward voltage drop of the first MOSFET is equal to the forward voltage drop of a diode, about 0.7 volts typically. Moreover, if the first MOSFET is turned on in the charging loop, the voltage drop of the first MOSFET is reduced to less than a hundred millivolts. The first and second MOSFETs are turned off by the controller to disenable the charging loop. Furthermore, the body diode of the first MOSFET is able to prevent premature discharge when the power source is in failure, for example, both nodes of the power source are shorted, or the power source is plugged in reverse. In both cases, the battery cannot be discharged through the body diodes of the first MOSFET, since the body diode and the discharging current are in opposite directions. As such, the charging loop is cut off completely and the premature discharge can be prevented.

While the foregoing description and drawings represent the preferred embodiments of the present invention, it will be understood that various additions, modifications and substitutions may be made therein without departing from the spirit and scope of the principles of the present invention as defined in the accompanying claims. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims and their legal equivalents, and not limited to the foregoing description.

What is claimed is:

1. A circuit for charging and discharging a battery, comprising:
    a first MOSFET having a first body diode and coupled to said battery for controlling discharging of said battery;
    a second MOSFET having a second body diode and coupled to said first MOSFET in series for controlling charging of said battery, wherein said first body diode of said first MOSFET and said second body diode of said second MOSFET are coupled in opposite directions;
    a load coupled to a common node between said first and second MOSFETs and coupled to said battery such that power in said battery is delivered to said load when said first MOSFET is turned on and said second MOSFET is turned off; and
    a controller coupled to gates of said first and second MOSFETs, and coupled to said common node, wherein said controller senses a current through said first MOSFET during said charging and during said discharging by sensing a drain voltage of said first MOSFET and a source voltage of said first MOSFET, and compares said current to a predetermined threshold, wherein if said current fails to satisfy said threshold then said current is adjusted under control of said controller.

2. The circuit as claimed in claim 1, further comprising:
    a power source coupled to said second MOSFET in series, wherein power is delivered from said power source to said battery when said first and second MOSFETs are turned on.

3. The circuit as claimed in claim 1, wherein said current flowing through said first MOSFET is a charging current.

4. The circuit as claimed in claim 1, wherein said current flowing through said first MOSFET is a discharging current.

5. The circuit as claimed in claim 1, wherein said first MOSFET comprises an inherent body diode which is able to prevent premature discharge when a power source coupled to said second MOSFET for charging said battery is in failure.

6. The circuit as claimed in claim 1, wherein said first MOSFET is turned on during both said charging and said discharging but said second MOSFET is turned on only during said charging.

7. The circuit as claimed in claim 1, wherein said controller determines said current through said first MOSFET by means of said drain voltage, said source voltage, and an on-state resistance of said first MOSFET, and controls said first and second MOSFETs according to a magnitude of said current.

8. The circuit as claimed in claim 1, wherein said first MOSFET and said second MOSFET are coupled in a common drain connection, wherein said common node comprises said common drain connection.

9. The circuit as claimed in claim 1, wherein said controller adjusts the voltages on the gates of said first and second MOSFETs to enable and disable said charging and said discharging.

10. The circuit as claimed in claim 1, wherein an on-state resistance of said first MOSFET is lower then an on-state resistance of said second MOSFET.

11. A method for charging and discharging a battery, comprising:
    coupling a first MOSFET to said battery in series;
    coupling a second MOSFET to said first MOSFET in series;
    charging said battery through said first and second MOSFETs with a power source that is coupled to said second MOSFET in series;
    discharging said battery through said first MOSFET to a load that is coupled to a common node commonly coupled to said first and second MOSFETs and said battery, such that power in said battery is delivered to said load when said first MOSFET is turned on and said second MOSFET is turned off;
    during both said charging and said discharging, sensing at a controller a current through said first MOSFET by sensing a drain voltage of said first MOSFET and a source voltage of said first MOSFET;
    comparing said current to a predetermined; and adjusting said current based on a result of said comparing in order to satisfy said threshold.

12. The method as claimed in claim 11, wherein said sensing comprises:
determining said current through said first MOSFET by means of said drain voltage, said source voltage, and an on-state resistance of said first MOSFET; and
turning off said first and second MOSFETs when a value of said current is greater than said threshold.

13. The method as claimed in claim 11, wherein said charging said battery comprises:
turning on said second MOSFET.

14. The method as claimed in claim 13, further comprising:
turning on said first MOSFET in order to reduce voltage loss.

15. The method as claimed in claim 14, further comprising:
preventing premature discharge by an inherent body diode of said first MOSFET, wherein said inherent body diode of said first MOSFET and a second inherent body diode of said second MOSFET are coupled in opposite directions.

16. The method as claimed in claim 11, further comprising:
turning off said first and second MOSFETs to stop said charging.

17. The method as claimed in claim 11, wherein said discharging comprises:
turning on said first MOSFET; and
turning off said first MOSFET.

18. A circuit for charging and discharging a battery, comprising:
a charging loop for delivering power from a power source to said battery, said charging loop comprising:
a first switch coupled to said battery; and
a second switch coupled to said first switch and said power source in series for controlling said charging loop;
a discharging loop for delivering power from said battery to a load that is coupled to a common node commonly coupled to said first and second switches and said battery, wherein said load is coupled to said battery and said first switch in series, and said first switch is used for controlling said discharging loop, such that power in said battery is delivered to said load when said first MOSFET is turned on and said second MOSFET is turned off; and
a controller coupled to gates of said first and second switches, and coupled to said common node, wherein said controller senses a current through said first switch during said charging and during said discharging by sensing a drain voltage of said first MOSFET and a source voltage of said first MOSFET, and compares said current to a predetermined threshold, wherein if said current is greater than said threshold then said current is reduced under control of said controller.

19. The circuit as claimed in claim 18, wherein said first switch comprises an inherent body diode which is able to prevent premature discharge when a power source coupled to said second switch for charging said battery is in failure.

20. The circuit as claimed in claim 18, wherein an on-state resistance of said first MOSFET is lower then an on-state resistance of said second MOSFET.

* * * * *